United States Patent

Seki et al.

[11] Patent Number: 5,113,050
[45] Date of Patent: May 12, 1992

[54] METHOD OF CREATING CORELESS-MACHINING NC DATA FOR WIRE CUT ELECTRIC DISCHARGE MACHINING

[75] Inventors: Masaki Seki, Suginami; Takashi Takegahara, Hachioji; Toru Matsunaka, Yanai, all of Japan

[73] Assignee: Fanuc Ltd., Yamanashi, Japan

[21] Appl. No.: 700,167

[22] PCT Filed: Sep. 17, 1990

[86] PCT No.: PCT/JP90/01185
§ 371 Date: May 9, 1991
§ 102(e) Date: May 9, 1991

[87] PCT Pub. No.: WO91/04121
PCT Pub. Date: Apr. 4, 1991

[30] Foreign Application Priority Data

Sep. 21, 1989 [JP] Japan .................. 64-243515

[51] Int. Cl.⁵ .................. B23H 7/06; B23H 7/20
[52] U.S. Cl. .................. 219/69.12; 364/474.04; 364/474.14; 364/474.34
[58] Field of Search .............. 219/69.12, 69.13, 69.17, 219/69.2; 83/651.1, 16, 39, 49, 54; 364/474.04, 474.14, 474.29, 474.34; 204/129.5

[56] References Cited

U.S. PATENT DOCUMENTS 5,038,011  8/1991  Nakayama .................. 219/69.12

FOREIGN PATENT DOCUMENTS 55-137834  10/1980  Japan .................. 219/69.17
62-216004   9/1987  Japan .................. 364/474.29
63-191518   8/1988  Japan .
63-304303  12/1988  Japan .

*Primary Examiner*—Geoffrey S. Evans
*Attorney, Agent, or Firm*—Staas & Halsey

[57] ABSTRACT

A method of creating coreless-machining NC data for wire-cut electric discharge machining is performed by an automatic programming device. After reading out a contour (C1) of a machining area (A1), a wire extension position (P0), and the maximum cutting amount from a part program, the programming device creates NC data used for moving a wire from the wire extension position (P0) to the central position (P1) of the machining area while effecting the electric discharge machining (S1), determines a spiral tool locus constituted by circular loci (PS1 to PS3) which are similar in shape to a pattern representing the machining area contour and which are separated from each other by the maximum cutting amount, and straight loci respectively connecting the circular loci to each other, and creates NC data effecting rough machining along the straight and circular loci which are located inside the inner circumferential curve (C2) of a finish machining area (S2). When NC data effecting final rough machining along the inner circumferential curve is created (S3), the cutting amount from the circular locus (C3) adjacent to the inner circumferential curve to this curve is limited to the distance therebetween. Finally created is NC data for effecting finish machining along finish machining loci (C4, C5, C1).

11 Claims, 2 Drawing Sheets

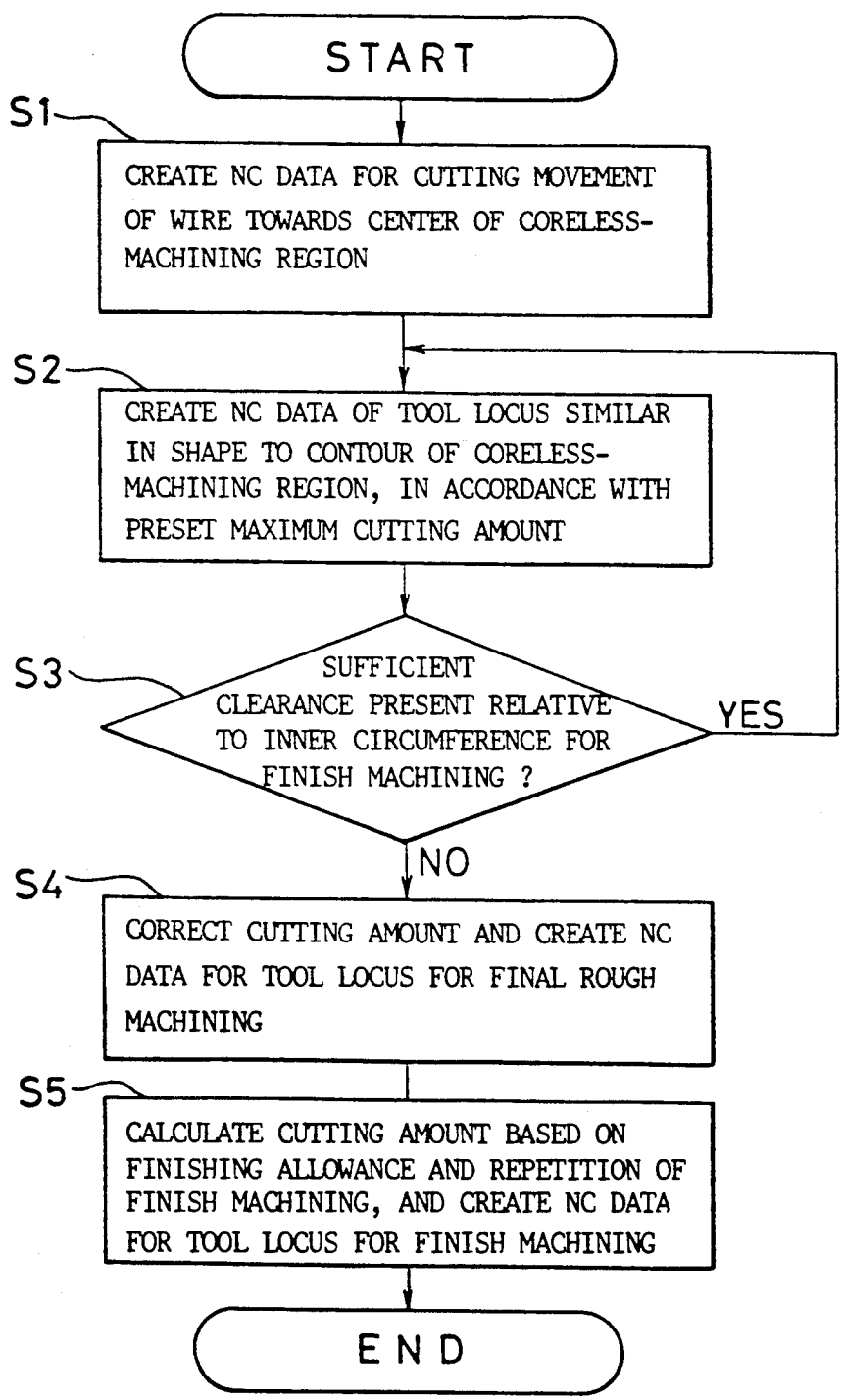

METHOD OF CREATING CORELESS-MACHINING NC DATA FOR WIRE CUT ELECTRIC DISCHARGE MACHINING

TECHNICAL FIELD

The present invention relates to a method of creating coreless-machining NC data for wire cut electric discharge machining.

BACKGROUND ART

When a piercing operation is performed by means of wire cut electric discharge machining, a core to be cut off from a workpiece body is held by the use of a jig such as a magnet or suction device, so that the core will not be dropped out from the workpiece body. However, if the core is small in size, the core may be dropped out from the workpiece body and may damage a wire (tool electrode) or parts of an electric discharge machine. Therefore, in the prior art, so-called coreless-machining is carried out, in which electric discharge machining is effected over the whole of a core area while moving the wire in the core area, so as to cause the entire core to be melted and thus prevented from being dropped out.

In the case of using a programming unit for electric discharge machining to create coreless-machining data (program), a pocket machining data creating function of a programming device for milling is conventionally utilized since the prior art device has no function used exclusively for the coreless-machining data creation. In this case, however, a definition inputting operation for defining the procedure of the coreless-machining is complicated, and the created NC data may conflict with inhibited matters inherent to the wire cut electric discharge machining. For example, unlike the milling, in the wire cut electric discharge machining for machining a workpiece by the use of a wire which extends through the workpiece, it is inhibited to cause a wire to be retarded from the workpiece, and then rapidly moved to and positioned at the machining starting position on the workpiece. When an inhibited operation of this kind is erroneously defined in the programming operation, wire disconnection may occur.

DISCLOSURE OF THE INVENTION

An object of the present invention is to provide a method of creating coreless-machining NC data for wire cut electric discharge machining.

In order to achieve the above-mentioned object, a method of creating NC data for coreless-machining according to the present invention comprises the steps of: (a) defining a coreless-machining area beforehand; (b) automatically determining a central position of the coreless-machining area as a machining starting position; (c) automatically determining a spiral wire locus starting from the machining starting position and reaching a contour of the coreless-machining area; and (d) automatically creating an NC data part used for moving a wire along the wire locus while performing electric discharge machining. Preferably, the method of the present invention further comprises a step of automatically creating an NC data part for moving the wire from a wire extension position to the machining starting position while performing electric discharge machining.

As described above, according to the present invention, since the central position of the previously defined coreless-machining area is automatically determined as the machining starting position, and the NC data part used for moving, where required, the wire from the wire extension position to the machining starting position while performing the discharge machining process is automatically created, a manual operation for inputting the machining starting position can be omitted, and the NC data conflicting with such inhibition matters, inherent to the wire cut discharge machining, as causing the wire to rapidly move from the wire extension position to the machining starting position can be prevented from being erroneously programmed, thus preventing the wire disconnection caused by this kind of erroneous programming operation. Further, since the NC data part used for moving the wire along the spiral wire locus from the center of the coreless-machining area to the contour of the coreless-machining area while effecting the discharge machining is automatically created, desired coreless NC data can be created without the need of performing a complicated definition inputting operation.

BRIEF DESCRIPTION OF THE DRAWINGS

FIG. 3 is a flowchart showing an NC data creating process for coreless-machining executed by the processor of the programming device of FIG. 1.

BEST MODE OF CARRYING OUT THE INVENTION

Figure 1:
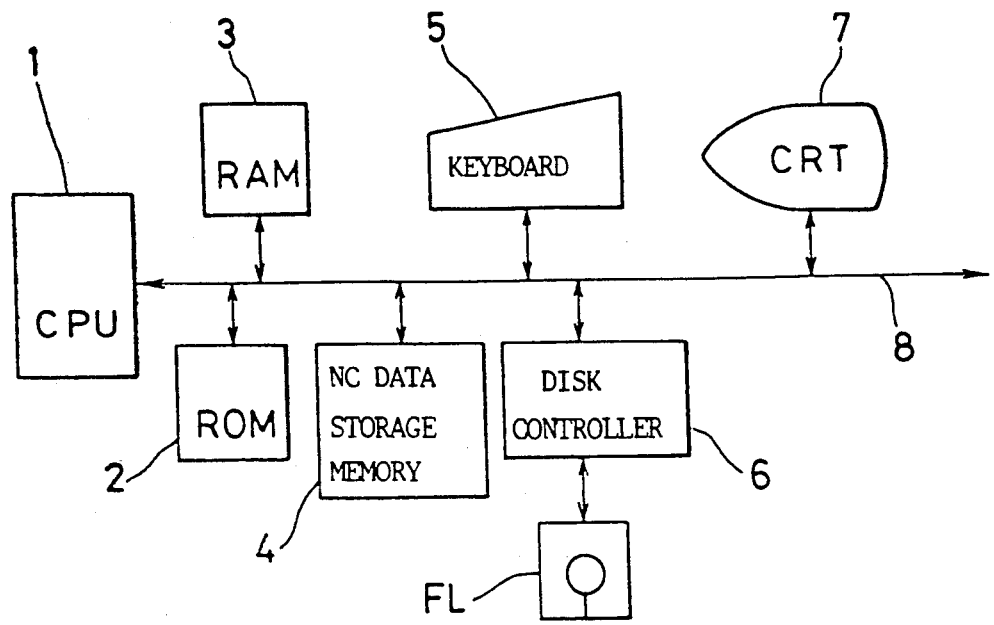
FIG. 1 is a schematic block diagram showing a principal part of an automatic programming device for embodying a method of creating NC data for coreless-machining according to one embodiment of the present invention.

Referring to FIG. 1, an automatic programming device for embodying an NC data creation method according to one embodiment of the present invention comprises a processor (CPU) 1, a read only memory (ROM) 2 storing a control program for operating the programming device, a random access memory (RAM) 3 for storing a system program, a part program and results of operation effected by the CPU 1, and a memory 4 for storing created NC data. Further, the programming device includes a keyboard 5, a disk controller 6, and a graphic display (CRT) 7. The disk controller 6 is arranged to removably loaded with a floppy disk FL for storing the system program, part program and created NC data. These elements 2 to 7 are connected to the CPU 1 via busses 8.

The programming device is operable to read out, statement by statement, a coreless-machining part program, which is created beforehand and preferably described by the use of a simple programming language FAPT, and execute the part program, to thereby automatically create coreless-machining NC data (program). In this embodiment, the part program shown in Table 1 is used.

The part program shown in Table 1 includes first to seventeenth statements respectively described on the first to seventeenth lines. The third and eighth statements containing a symbol "*" are comment lines, i.e., non-execution sentences in which notes on the program are given, and in this embodiment, the symbol "*" is used as a line feed symbol to permit the program to be easily read.

The first statement "PART, @CORELESS" is the heading of the part program which indicates that the program is a coreless-machining part program. The second statement "MCHN, CUT, ABS" indicates that the part program is to be processed by the means of an absolute system and in accordance with a wire-cut electric discharge machining system disk library FAPT-CUT.

TABLE 1

```
PART, @CORELESS
MCHN, CUT, ABS
•
AREA, A1
FROM, P0 (5, 0)
C1 (0, 0, 5), CW, P0
AEND
•
WIRE, 0.25
FROM, P100 (100, 100)
RPD, P1 (0, 0)
@M60
CORLES/A1, 0.1, 0.03, FINE, 3
@M50
RPD, P100
FINI
PEND
```

A coreless-machining area is defined by the fourth to seventh statements. That is, the name of the coreless-machining area is defined to be "A1" by the fourth statement "AREA, A1", and a point P0 (FIG. 2) represented by a coordinate position (5, 0) on a workpiece coordinate system is specified as the starting point of the contour of the coreless-machining area, by the fifth statement "FROM, P0 (5, 0). Further, by the sixth statement "C1 (0, 0, 5), CW, P0, " a circle C1 having a radius of 5 mm and a center set on the coordinate position (0, 0) on the workpiece coordinate system is specified as a pattern forming the contour of the coreless-machining area, the clockwise direction is specified as the direction in which the coreless-machining is effected, and the point P0 is specified as the end point of the contour. The seventh statement "AEND" indicates the completion of definition of the coreless-machining area.

The ninth statement "WIRE, 0.25" indicates that a wire having a diameter of 0.25 mm should be used. The tenth to twelfth statements are associated with an automatic wire extension process, and a point P100 represented by a coordinate position (100, 100) on the workpiece coordinate system is specified as a movement starting point of the wire, by the tenth statement "FROM, P100 (100, 100)". The eleventh statement "RPD, P1 (0, 0)" includes a command "RPD" for commanding rapid movement of a tool (wire). In this statement, the defined point P1 at the coordinate position (0, 0) in the workpiece coordinate system is specified as the end point of the rapid moving operation. The twelfth statement "@M60" indicates execution of the wire extension process.

The thirteenth statement "CORLES/A1, 0.1, 0.03, FINE, 3" is associated with creation of NC data for coreless-machining, and is generally described in the form of "CORLES/name, Cr, Cf, FINE, n". That is, the statement associated with the NC data creation contains a command "CORLES" for commanding creation of NC data for coreless-machining, and a command "FINE" for commanding execution of finish machining. Further, in this statement, the title "name" of the coreless-machining area, maximum cutting amount "Cr", finishing allowance "Cf" and repetition "n" of finish machining are specified. In the thirteenth statement of this embodiment, the title of the coreless-machining area, maximum cutting amount, finishing allowance and repetition of finish machining are respectively specified to be "A1", "0.1 mm", "0.03 mm" and "3".

The fourteenth statement "@M50" indicates that the wire should be cut after completion of the coreless-machining operation, and the fifteenth statement "RPD, P100" indicates return of the wire to the defined point P100. Further, the sixteenth statement "FINI" indicates completion of the execution, and the seventeenth statement "PEND" indicates the program end.

Now, the operation of the automatic programming device will be explained.

When an operator operates the keyboard 5 to input a coreless-machining NC data creation command into the coreless-machining device after the floppy disk FL having the created coreless-machining part program (Table 1) and the system program stored therein is loaded into the disk controller 6, the part program and system program are transferred from the floppy disk FL to the RAM 3 under the control of the CPU 1 of the programming device. Then, in accordance with the system program, the CPU 1 executes the coreless-machining NC data creation process of FIG. 3. During the data creation process, the CPU 1 reads out and executes the part program statement by statement. As described above, the third and eighth statements are not executed.

More specifically, in accordance with the first statement "PART, @CORELESS", the CPU 1 creates the title of the program for specifying that NC data now created is the coreless-machining data, and stores the same into the RAM 3. Then, in accordance with the second statement "MCHN, CUT, ABS", the CPU determines that the part program should be executed by means of the absolute system and in accordance with the system disk library FAPTCUT.

Next, the CPU 1 determines, on the basis of the fourth to seventh statements, the central position of the coreless-machining area A1 on the workpiece coordinate system, that is, the coreless-machining starting position P1 (0, 0), determines, on the basis of the eleventh and twelfth statements the position of formation of the wire insertion hole for wire extension, that is, the wire extension position P1 (0, 0), and creates a first data part used for moving the wire from the wire extension position to the machining starting position while effecting electric discharge machining (step S1 in FIG. 3). The first data part constitutes part of the coreless-machining NC data (program) and is stored into the RAM 3. In this embodiment, the wire extension position and the machining starting position are both equal to the defined point P1 (0, 0), and therefore, the first data part indicating that the wire movement from the wire extension position to the machining starting position is not necessary is created.

As described above, since the machining starting position can be automatically determined based on the statements of the part program, it is not necessary to manually input the machining starting position into the programming device, unlike the conventional method. This is convenient. Further, in case that the wire extension position and the machining starting position are different from each other, it is possible to automatically create a first data part used for moving the wire from the wire extension position to the machining starting position while effecting the electric discharge machining. Thus, erroneous creation of NC data which causes the wire to rapidly move from the wire extension position to the machining starting position can be prevented, unlike the conventional method.

Next, on the basis of the statement "CORELES/-name, Cr, Cf, FINE, n", the CPU 1 creates a second NC data part which constitutes part of the NC data for the coreless-machining, for causing the wire to move along the spiral tool locus extending from the machining start position to the vicinity of the contour of the coreless-machining area.

At first, the CPU 1 determines a first target position which is separated outwardly from the machining starting position by a preset cutting amount which is equal to or less than the maximum cutting amount Cr, and determines a first straight tool locus by which the machining starting position is connected with the first target position. Then, the CPU creates data used for moving the wire from the machining starting position to the first target position along the first straight tool locus while effecting rough machining. In accordance with the thirteenth statement "CORLES/A1, 0.1, 0.03, FINE, 3", the first target position in this embodiment is set to a position which is separated from the defined position P1 by the maximum cutting amount of 0.1 mm in the positive direction along the Y axis. Then, the CPU 1 determines a first curved tool locus which is similar in shape to the pattern representing the contour of the machining area, and which is apart outwardly from the machining starting position by the preset cutting amount. The first curved tool locus starts at the first target position, and ends at the first target position. Further, the CPU 1 creates data for moving the wire in a coreless-machining direction along the first curved tool locus while effecting rough machining (step S2). In this embodiment, the CPU creates data for moving the wire in the clockwise direction along a circular locus PS1 having a radius of 0.1 mm and a center set at the defined point P1. In case that the contour of the coreless-machining area is represented by an irregular pattern other than a circle or regular polygon, the preset cutting amount and first tool locus are determined by the use of cutting amounts in the X and Y directions respectively set to values not larger than the maximum cutting amount Cr and varying in dependence on the pattern shape.

Subsequently, the CPU 1 determines the inner circumferential curve of a finish machining area which is separated inwardly from the contour of the machining area by the finishing allowance Cf, and then determines whether or not the distance between the first curved tool locus determined in the step S2 and the inner circumferential curve of the finish machining area is equal to or larger than the preset cutting amount (step S3). In this embodiment, a determination is made as to whether or not the distance between the inner circumferential curve C2 of the finish machining area which is set apart by 0.03 mm inwardly from the contour C1 of the machining area and the first circular locus PS1 is equal to or larger than the maximum cutting amount of 0.1 mm. Since the result of determination at the step S3 here is affirmative, the program is returned to the step S2.

Upon execution of the step S2 at the j-th (j=2, 3, ...) cycle, the CPU 1 determines the j-th target position which is set apart outwardly from the (j−1) th target position by the preset cutting amount (j times the preset cutting amount from the machining starting position), and determines the j-th straight tool locus connecting the (j−1) th target position with the j-th target position. Then, the CPU 1 creates data for moving the wire from the (j−1) th target position to the j-th target position along the j-th straight tool locus while effecting rough machining. The j-th target position in this embodiment is determined to a position which is set apart from the defined point P1 in the positive direction along the Y axis by j times the maximum cutting amount of 0.1 mm. Then, the CPU 1 determines the first curved tool locus, which is similar in shape to the pattern representing the contour of the machining area and which is separated outwardly from the machining starting position by j times the preset cutting amount, and creates data for moving the wire in the coreless-machining direction along the first curved tool locus while effecting rough machining. In this embodiment, data for moving the wire in the clockwise direction along the j-th circular locus having a center set on the defined point P1 and a radius of $(0.1 \times j)$ mm is created. Then, the CPU 1 determines whether or not the distance between the j-th curved tool locus determined in the step S2 and the inner circumferential curve of the finish machining area is larger than the preset cutting amount (step S3). In this embodiment, a determination is made as to whether or not the distance between the inner circumferential curve C2 of the finish machining area and the j-th circular locus PSj is larger than the maximum cutting amount of 0.1 mm.

When it is determined in the step S3 that the distance between the j-th curved tool locus and the inner circumferential curve of the finish machining area is less than the preset cutting amount while a process corresponding to steps S2 and S3 is repeatedly executed, the CPU 1 creates a third data part used for executing a final stage of the rough machining (step S4).

More specifically, on the basis of the j-th curved tool locus and the inner circumferential curve of the finish machining area, the CPU 1 sequentially determines a final rough machining amount, a (j+1) target position separated outwardly from the j-th target position by the final rough machining amount, and a (j+1) th straight tool locus which connects the j-th target position with the (j+1) th target position. Then, the CPU 1 creates data for moving the wire from the j-th target position to the (j+1) th target position along the (j+1) th straight tool locus while effecting the rough machining. Next, the CPU 1 creates data for moving the wire in the coreless-machining direction along the inner circumferential curve of the finish machining area while effecting the rough machining. In the example of FIG. 3, the radii of the inner circumferential curve C2 of the finish machining area and the j-th curved tool locus C3 are respectively set to 4.97 mm and 4.9 mm, and hence the final machining amount is set to 0.07 mm which is smaller than the maximum cutting amount of 0.1 mm.

Finally, the CPU 1 creates a fourth data part used for moving the wire along the finish machining locus while effecting electric discharge machining (step S5). The fourth data part constitutes the NC data for coreless-machining in cooperation with the first to third data parts. The finish machining locus continues to the rough machining locus constituted by the first to (j+1) th straight tool loci, the first to j-th curved tool loci, and the inner circumferential curve of the finish machining area (j+1) th curved tool locus), and cooperates with the rough machining locus to constitute the coreless-machining tool locus.

Figure 2:
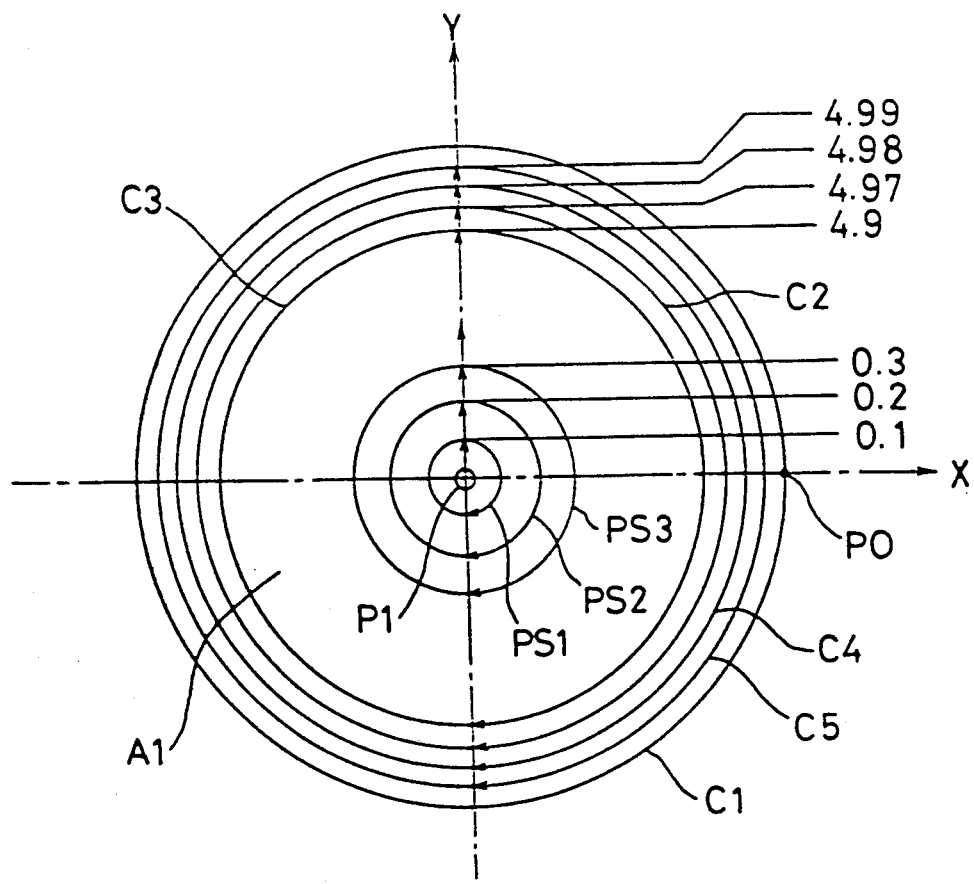
FIG. 2 is a schematic diagram showing a coreless-machining area and part of a wire locus.

More specifically, the CPU 1 calculates a second preset cutting amount by dividing the finishing allowance Cf by the repetition n of finish machining, determines the (j+i+1)th target position which is separated outwardly from the (j+i)th (i=1, 2, 3) target position by i times the second preset cutting amount, and determines a (j+i+1)th straight tool locus which connects the (j+i)th target position with the (j+i+1)th target position. Then, the CPU 1 creates data for moving the wire from the (j+i)th target position to the (j+i+1)th target position along the (j+i+1)th straight tool locus while effecting the finish machining. Further, the CPU 1 determines a (j+i+1)the curved tool locus which is similar in shape to the contour of the machining area and which is separated from the machining starting position by the distance equal to the sum of j times the preset cutting amount, final rough machining amount and i (i=1, 2) times the second preset cutting amount, and creates data for moving the wire in the coreless-matching direction along the (j+i+1)th curved tool locus and the contour of the machining area while effecting the finish machining. In this embodiment, the finishing allowance is 0.03 mm and the repetition of finish machining is 3, and hence the second preset cutting amount becomes 0.01 mm. In FIG. 2, symbol C1 denotes the contour of the machining area A1, and C4 and C5 respectively denote (j+2)th and (j+3)th curved tool loci having radii of 4.98 mm and 4.99 mm.

After completing creation of the coreless-machining NC data (program) consitituted by the first to fourth data parts, the CPU 1 causes the thus created NC data to be stored into the memory 4 in a manner readable therefrom.

We claim:

1. A method of creating NC data for coreless-matchining comprising the steps of:
   (a) defining a coreless-matching area beforehand;
   (b) automatically determining a central position of the coreless-matchining area as a machining starting position;
   (c) automatically determining a spiral wire locus starting from the machining starting position and reaching a contour of the coreless-matchining area; and
   (d) automatically creating an NC data part used for moving a wire along the wire locus while performing electric discharge machining.

2. A method of creating NC data for coreless-machining according to claim 1, further including:
   a step (e) of automatically creating an NC data part used for moving the wire from a wire extension position to the machining starting position while effecting electric discharge machining.

3. A method of creating NC data for coreless-machining according to claim 2, wherein said steps (b) to (e) are executed by use of an automatic programming device, and said step (a) is executed by defining the coreless-machining area beforehand in the automatic programming device.

4. A method of creating NC data for corless-machining according to claim 3, wherein said step (a) is executed by describing a definition of the coreless-machining area into a part program.

5. A method of creating NC data for coreless-machining according to claim 2, wherein the NC data part created in said step (e) indicates that is is not necessary to move the wire from the wire extension position to the machining starting position when the wire extension position coincides with the machining starting position.

6. A method of creating NC data for coreless-machining according to claim 1, further including the steps of:
   (f) defining a finishing allowance; and
   (g) determining an inner circumferential curve of a finish machining area which extends along the contour of the coreless-machining area;
   wherein the data part created in said step (d) contains a first sub data part used for effecting rough machining along that portion of the spiral wire locus which is located inside the inner circumferential curve, and a second sub data part used for effecting finish machining along that portion of the spiral wire locus which is located outside the inner circumferential curve.

7. A method of creating NC data for coreless-machining according to claim 6, wherein the first sub data part is so created that the rough machining is performed along the inner circumferential curve.

8. A method of creating coreless-machining NC data according to claim 1, wherein the spiral wire locus is so determined as to include a plurality of curved wire loci which are similar in shape to a pattern representing the contour of the coreless-machining area, adjacent ones of the plurality of curved wire loci being separated from each other.

9. A method of creating NC data for coreless-machining according to claim 8, wherein the spiral tool locus is so determined as to include a plurality of straight wire loci each of which connects corresponding adjacent ones of the curved wire loci to each other.

10. A method of creating NC data for coreless-machining according to claim 8, wherein the plurality of curved wire loci are so determined that adjacent ones of the plurality of curved wire loci are separated from each other by a preset cutting amount.

11. A method of creating NC data for coreless-machining according to claim 9, further including the steps of:
   (f) defining a finishing allowance; and
   (g) determining an inner circumferential curve of a finish machining area which extends along the contour of the coreless-machining area;
   wherein the data part created in said step (d) contains a first sub data part used for effecting rough machining along the inner circumferential curve and that portion of the plurality of curved wire loci which is located inside the inner circumferential curve, and a second sub data part used for effecting finish machining along that portion of the plurality of curved tool loci which is located outside the inner circumferential curve;
   and wherein the length of a corresponding one of the plurality of straight wire loci is set to be equal to a distance between the inner circumferential curve and that one of the plurality of curved wire loci which is located inside and adjacent to the inner circumferential curve when it is determined that the distance between the inner circumferential curve and the curved wire locus adjacent thereto is smaller than the preset cutting amount.

* * * * *

UNITED STATES PATENT AND TRADEMARK OFFICE
CERTIFICATE OF CORRECTION

PATENT NO. : 5,113,050
DATED : May 12, 1992
INVENTOR(S) : Masaki Seki et al.

It is certified that error appears in the above-identified patent and that said Letters Patent is hereby corrected as shown below:

Title Page, [73], "Yamanashi" should be --Minamitsuru--;

[57], line 3, delete "is";

line 4, before "an" insert --the use of--;

line 16, after "data" insert --for--; and last line, after "(C4,C5,C1)" insert --which are determined based on the finishing allowance and the repetition of finish machining specified in the part program and which are located outside the inner circumferential curve (S4)--

\* Col. 2, line 35, delete "BEST MODE OF CARRYING OUT THE INVENTION" and insert --DESCRIPTION OF THE PREFERRED EMBODIMENTS--; and line 49, after "to" insert --be--.

UNITED STATES PATENT AND TRADEMARK OFFICE
CERTIFICATE OF CORRECTION

PATENT NO. : 5,113,050

DATED : May 12, 1992

INVENTOR(S) : Masaki Seki et al.

It is certified that error appears in the above-identified patent and that said Letters Patent is hereby corrected as shown below:

Col. 4, line 43, after "(0,0)" delete the comma;

line 44, after "statements" insert a comma; and line 63, delete "that".

Col. 5, line 40. delete "that".

Col. 6, line 66, "(j+1)th curved tool locus)" should be --((j+1)th curved tool locus)--.

Col. 7, line 13, "(j+i+1)the" should be --(j+i+1)th--;

lines 35 and 36, delete "matchining" and insert --machining--;

line 37, delete "matching" and insert --machining--;

line 39, delete "matchining" and insert --machining--;

line 43, delete "matchining" and insert --machining--;

UNITED STATES PATENT AND TRADEMARK OFFICE
CERTIFICATE OF CORRECTION

PATENT NO. : 5,113,050
DATED : May 12, 1992
INVENTOR(S) : Masaki Seki et al.

It is certified that error appears in the above-identified patent and that said Letters Patent is hereby corrected as shown below:

Col. 7, line 60, delete "corless" and insert

--coreless--;

Col. 8, line 55, after ";" insert --and--; and line 56, delete "and".

Signed and Sealed this

Twenty-fourth Day of August, 1993

BRUCE LEHMAN

*Attest:*

*Attesting Officer*  *Commissioner of Patents and Trademarks*